US008033374B2

(12) United States Patent
Gunton

(10) Patent No.: US 8,033,374 B2
(45) Date of Patent: Oct. 11, 2011

(54) DRIVE ARRANGEMENT

(76) Inventor: Bruce Stanley Gunton, Staffordshire (GB)

( * ) Notice: Subject to any disclaimer, the term of this patent is extended or adjusted under 35 U.S.C. 154(b) by 1246 days.

(21) Appl. No.: 10/598,920

(22) PCT Filed: Mar. 17, 2005

(86) PCT No.: PCT/GB2005/001121
§ 371 (c)(1), (2), (4) Date: Jan. 12, 2007

(87) PCT Pub. No.: WO2005/090730
PCT Pub. Date: Sep. 29, 2005

(65) Prior Publication Data

US 2008/0127558 A1 Jun. 5, 2008

(30) Foreign Application Priority Data

Mar. 20, 2004 (GB) .................................. 0406359.0

(51) Int. Cl.
*F16D 13/76* (2006.01)
*F16D 67/00* (2006.01)
*F16D 21/04* (2006.01)
*F16D 11/06* (2006.01)
*F16H 57/10* (2006.01)
*F16H 7/08* (2006.01)
*F16H 7/22* (2006.01)
*F16H 19/06* (2006.01)
*F16K 31/05* (2006.01)
*A47H 1/00* (2006.01)
*E05F 11/00* (2006.01)

(52) U.S. Cl. ............ 192/224; 192/20; 192/71; 474/101; 74/37; 74/625; 160/331; 49/324

(58) Field of Classification Search .................... 474/70, 474/74, 81, 101, 105, 113; 192/11, 20, 71, 192/86, 106 R, 224; 74/37, 625; 160/331, 160/188; 49/197, 199, 200, 324; 476/16, 476/17
See application file for complete search history.

(56) References Cited

U.S. PATENT DOCUMENTS

| | | | | | |
|---|---|---|---|---|---|
| RE6,007 | E | * | 8/1874 | Williamson | 192/224 |
| 488,197 | A | * | 12/1892 | Hackney | 474/113 |
| 512,850 | A | * | 1/1894 | Vandegrift | 474/79 |
| 657,765 | A | * | 9/1900 | Gibbs | 474/113 |
| 731,472 | A | * | 6/1903 | Pontois | 192/84.21 |

(Continued)

FOREIGN PATENT DOCUMENTS

| | | |
|---|---|---|
| CA | 2338191 | 8/2002 |

(Continued)

*Primary Examiner* — Michael Mansen
*Assistant Examiner* — Henry Liu
(74) *Attorney, Agent, or Firm* — Chernoff, Vilhauer, McClung & Stenzel

(57) ABSTRACT

A drive arrangement for a shaft has a module carried by the shaft and including a motor, a driven wheel and a drive wheel. The motor, gearbox and drive wheel are carried on a slider plate which can slide transverse to the axis of the shaft. A front plate is fixed transverse to the axis of the shaft. A Bowden cable has its sheath attached to the front plate, and its inner cable attached to the slider plate, so that manipulation of the Bowden cable at a remote location allows force to be applied between the plates either tightening the belt to apply drive from the motor to the shaft, or releasing tension in the belt, to disengage the drive.

6 Claims, 10 Drawing Sheets

U.S. PATENT DOCUMENTS

| | | | | | |
|---|---|---|---|---|---|
| 731,588 | A | * | 6/1903 | Meinhard | 192/219 |
| 808,878 | A | * | 1/1906 | Smith | 476/16 |
| 849,185 | A | * | 4/1907 | Baldwin | 74/37 |
| 893,999 | A | * | 7/1908 | Hart | 476/16 |
| 899,247 | A | * | 9/1908 | Drake | 192/20 |
| 967,313 | A | * | 8/1910 | Bertrand | 474/113 |
| 1,129,018 | A | * | 2/1915 | Robertson | 192/224 |
| 1,225,144 | A | * | 5/1917 | Land | 192/20 |
| 1,278,485 | A | * | 9/1918 | Lewis | 192/224 |
| 1,312,981 | A | * | 8/1919 | Hambek | 74/370 |
| 1,335,736 | A | * | 4/1920 | Jackson | 474/81 |
| 1,460,070 | A | * | 6/1923 | Maimin | 476/64 |
| 1,672,959 | A | * | 6/1928 | Spillman | 474/138 |
| 1,882,022 | A | * | 10/1932 | Leyvastre | 290/31 |
| 1,985,213 | A | * | 12/1934 | Page | 451/47 |
| 2,043,967 | A | * | 6/1936 | Blanchard | 82/117 |
| 2,066,174 | A | * | 12/1936 | Cregier | 56/11.6 |
| 2,082,260 | A | * | 6/1937 | Reid | 474/89 |
| 2,111,009 | A | * | 3/1938 | Smith | 160/5 |
| 2,156,701 | A | * | 5/1939 | Petersen | 474/114 |
| 2,164,884 | A | * | 7/1939 | Nenninger et al. | 409/228 |
| 2,184,541 | A | * | 12/1939 | Aikman | 248/656 |
| 2,204,943 | A | * | 6/1940 | Mercer | 74/15.6 |
| 2,205,176 | A | * | 6/1940 | Sauer | 474/115 |
| 2,251,772 | A | * | 8/1941 | Zuber | 242/356.3 |
| 2,257,796 | A | * | 10/1941 | Heineke | 474/113 |
| 2,276,258 | A | * | 3/1942 | Horowitz | 192/3.57 |
| 2,398,300 | A | * | 4/1946 | Frazier | 474/89 |
| 2,411,038 | A | * | 11/1946 | Hetteen | 254/356 |
| 2,458,255 | A | * | 1/1949 | Couse | 474/113 |
| 2,458,767 | A | * | 1/1949 | Cooper | 474/113 |
| 2,459,373 | A | * | 1/1949 | Gettys | 192/224.1 |
| 2,464,175 | A | * | 3/1949 | Edwin | 474/113 |
| 2,488,765 | A | * | 11/1949 | Couse | 474/113 |
| 2,521,163 | A | * | 9/1950 | Hasselquist | 192/224 |
| 2,533,022 | A | * | 12/1950 | Kuhl | 74/13 |
| 2,670,630 | A | * | 3/1954 | Williams | 476/17 |
| 2,724,230 | A | * | 11/1955 | Burmeister | 56/17.4 |
| 2,734,386 | A | * | 2/1956 | Schroeder | 74/10.7 |
| 2,742,750 | A | * | 4/1956 | Funk | 56/11.3 |
| 2,783,595 | A | * | 3/1957 | Hill | 451/398 |
| 2,876,645 | A | * | 3/1959 | Schuh | 74/8 |
| 2,911,849 | A | * | 11/1959 | Mitchell et al. | 477/19 |
| 2,912,871 | A | * | 11/1959 | Velkoff | 476/17 |
| 2,934,187 | A | * | 4/1960 | Zahner | 192/224 |
| 2,948,374 | A | * | 8/1960 | Husband | 192/135 |
| 2,970,587 | A | * | 2/1961 | Estes | 123/195 E |
| 3,041,884 | A | * | 7/1962 | Elfes | 74/15.86 |
| 3,058,363 | A | * | 10/1962 | Unruh | 474/89 |
| 3,106,251 | A | * | 10/1963 | Lucas | 172/16 |
| 3,132,729 | A | * | 5/1964 | Garland | 192/224.3 |
| 3,164,294 | A | * | 1/1965 | Phillips et al. | 221/84 |
| 3,187,674 | A | * | 6/1965 | Hammelmann | 417/223 |
| 3,302,759 | A | * | 2/1967 | Nydam | 192/224 |
| 3,306,121 | A | * | 2/1967 | Jenkins | 474/117 |
| 3,430,507 | A | * | 3/1969 | Oswald et al. | 474/113 |
| 3,526,305 | A | * | 9/1970 | August | 192/3.34 |
| 3,730,037 | A | * | 5/1973 | Purrer | 83/68 |
| 3,762,233 | A | * | 10/1973 | Colloton | 474/117 |
| 3,808,899 | A | * | 5/1974 | Cooper | 476/16 |
| 3,814,358 | A | * | 6/1974 | Sloyan | 248/655 |
| 3,922,927 | A | * | 12/1975 | Shiki et al. | 474/113 |
| 4,037,389 | A | * | 7/1977 | Harkness | 56/11.3 |
| 4,048,788 | A | * | 9/1977 | Kamlukin et al. | 56/11.3 |
| 4,217,537 | A | * | 8/1980 | Hamm | 322/1 |
| 4,223,757 | A | * | 9/1980 | Olander | 180/273 |
| 4,242,855 | A | * | 1/1981 | Beaver, Jr. | 56/13.7 |
| 4,311,225 | A | * | 1/1982 | Tsubaki et al. | 192/142 R |
| 4,353,526 | A | | 10/1982 | Weidmann | |
| 4,409,779 | A | * | 10/1983 | Bent et al. | 56/11.3 |
| 4,560,046 | A | * | 12/1985 | Lorello et al. | 192/224.1 |
| 4,571,221 | A | * | 2/1986 | Isobe et al. | 474/101 |
| 4,586,706 | A | * | 5/1986 | Chen | 482/62 |
| 4,618,336 | A | * | 10/1986 | Isobe et al. | 474/133 |
| 4,743,225 | A | * | 5/1988 | Okabe | 474/133 |
| 4,819,708 | A | * | 4/1989 | Onosato et al. | 160/331 |
| 4,829,328 | A | * | 5/1989 | Tanaka et al. | 396/418 |
| 4,836,345 | A | * | 6/1989 | Anderson | 192/20 |
| 4,850,725 | A | * | 7/1989 | Walker et al. | 400/236.2 |
| 4,900,294 | A | | 2/1990 | Schneeberger | |
| 5,002,518 | A | * | 3/1991 | Pennatto | 474/113 |
| 5,352,320 | A | * | 10/1994 | Schwartz et al. | 156/494 |
| 5,374,035 | A | * | 12/1994 | Santos | 254/339 |
| 5,413,162 | A | * | 5/1995 | Ciriaci | 160/177 V |
| 5,581,939 | A | | 12/1996 | Regan et al. | |
| 5,595,251 | A | * | 1/1997 | Cook, Jr. | 173/178 |
| 5,611,386 | A | * | 3/1997 | Wang | 160/344 |
| 5,698,073 | A | | 12/1997 | Vincenzi | |
| 6,089,488 | A | * | 7/2000 | Shimbo et al. | 242/356.3 |
| 6,091,217 | A | | 7/2000 | Parsadayan | |
| 6,186,915 | B1 | * | 2/2001 | Dietl | 474/8 |
| 6,422,965 | B1 | | 7/2002 | Balli et al. | |
| 7,617,899 | B1 | * | 11/2009 | Warner et al. | 180/190 |

FOREIGN PATENT DOCUMENTS

| | | |
|---|---|---|
| GB | 1453037 | 10/1976 |
| GB | 1549857 | 8/1979 |
| GB | 2201192 | 8/1988 |
| GB | 2285482 | 7/1995 |
| GB | 2378219 | 2/2003 |
| WO | 9323324 | 11/1993 |
| WO | 02090699 | 11/2002 |

* cited by examiner

DRIVE ARRANGEMENT

This is a national stage application filed under 35 USC 371 based on International Application No. PCT/GB2005/001121 filed Mar. 17, 2005, and claims priority under 35 USC 119 of United Kingdom Patent Application No. 0406359.0 filed Mar. 20, 2004.

The present invention relates to drive arrangements and in particular, but not exclusively, to drive arrangements for driving shafts of electrically operated doors, shutters and the like.

Many doors, such as up-and-over garage doors, roller shutter doors and the like are provided with motors for driving the doors to open or close. In many previous proposals, the motor is mounted on a framework or door surround but this may be bulky, or be difficult and time consuming to fit, particularly when fitted to existing door systems in place of other motor arrangements. A previous proposal of the present applicant is described in PCT patent application no. WO 02/090699.

The present invention provides a drive arrangement for a shaft, the arrangement having a module which is carried, in use, by the shaft and includes a motor, a driven wheel fixed, in use, for rotation with the shaft and drivable, in use, by the motor, and clutch means operable between the motor and the wheel, the clutch means including a base structure carried, in use, by the shaft, a first carriage structure movable relative to the base structure and carrying the motor, a drive wheel driven by the motor, and a belt around the drive wheel and the driven wheel, whereby the belt can be releasably engaged with the wheels by means of movement of the first carriage structure relative to the base structure, and wherein control means are provided and are operable, in use, to releasably apply a force between the first carriage structure and the base structure, to urge apart the drive wheel and the driven wheel, thereby engaging the clutch means.

Preferably the control means is operable from a remote location. The control means may be operable by means of a control cable extending from the arrangement to the remote location. The control cable is preferably a Bowden cable extending from the assembly to the remote location and having an inner cable and sheath mounted to respective ones of the first carriage structure and the base structure, whereby the said force may be applied by manipulation of the Bowden cable at the remote location.

Preferably, the inner cable is mounted to the first carriage structure. Preferably the sheath is mounted to the base structure. Preferably, the sheath is fixedly mounted at the remote location, whereby the clutch means may be operated by manipulation of the inner cable relative to the sheath.

The arrangement preferably includes a second carriage structure movable relative to the base structure into and out of driving engagement with the shaft. The second carriage structure and the shaft may carry respective toothed members which mesh when the second carriage structure and the shaft are in driving engagement. The second carriage structure preferably includes manually operable drive means for manually driving the shaft when the second carriage structure and the shaft are in driving engagement. The manually operable drive means may comprise a wheel operable to turn by means of an elongate closed loop member, the wheel being coupled with the toothed member of the second carriage structure, to cause the shaft to be driven when the wheel is turned and the toothed members are meshed.

The control cable is preferably a Bowden cable extending from the assembly to the remote location and having an inner cable and sheath attached to respective ones of the first and second carriage structures, whereby the said force may be applied by manipulation of the Bowden cable at the remote location. Preferably spring means are provided to urge the second carriage member into driving engagement with the shaft, when the Bowden cable is released. The sheath is preferably attached to the second carriage member. The inner cable is preferably attached to the first carriage member. The sheath is preferably fixedly mounted at the remote location, whereby the clutch means may be operated by manipulation of the inner cable relative to the sheath.

Embodiments of the invention will now be described in more detail, by way of example only, and with reference to the accompanying drawings, in which:—

Figure 6:
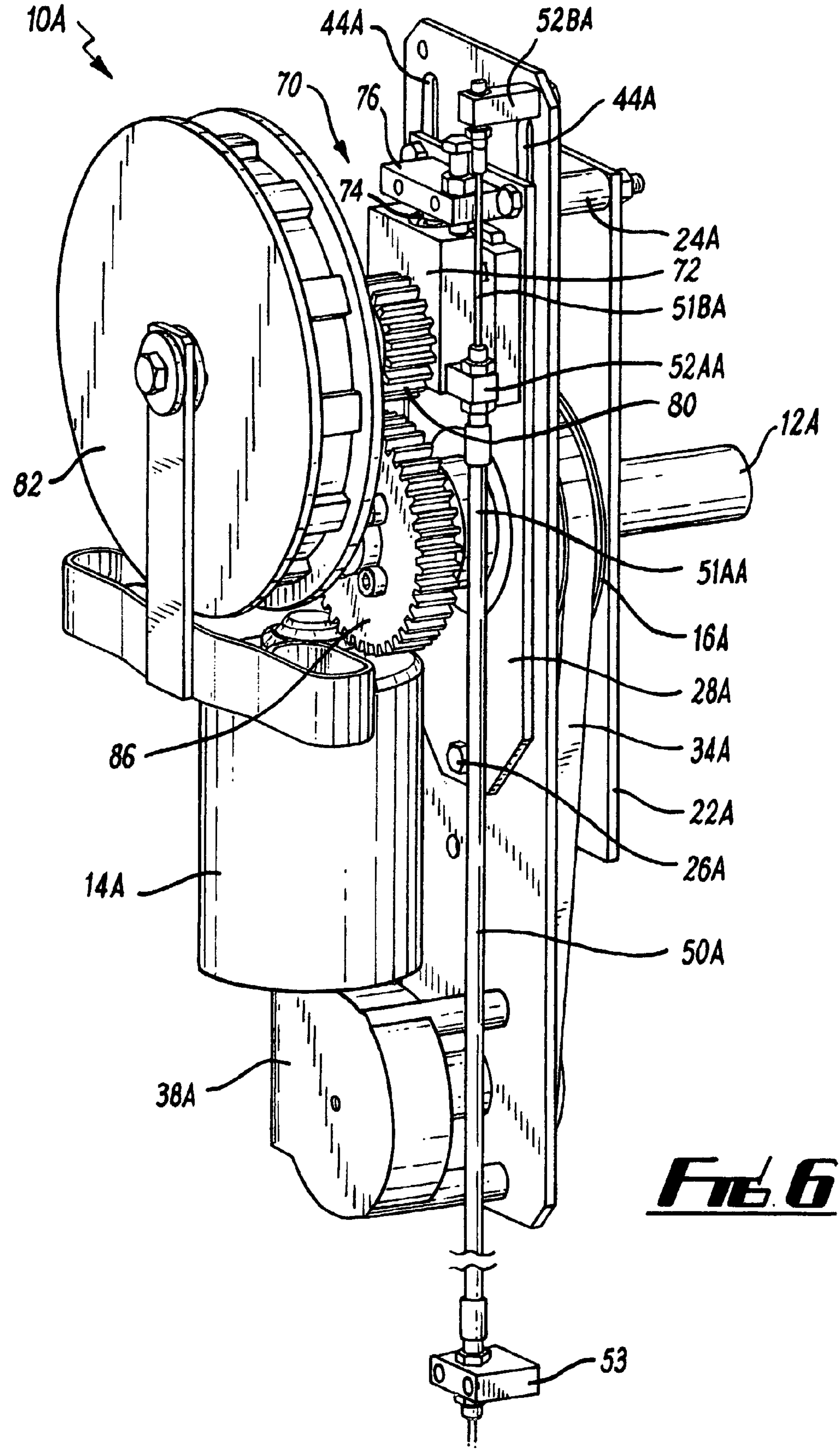
FIG. 6 is a partial front perspective view of a second embodiment of the present invention, installed for driving a shaft.
Figure 7A:
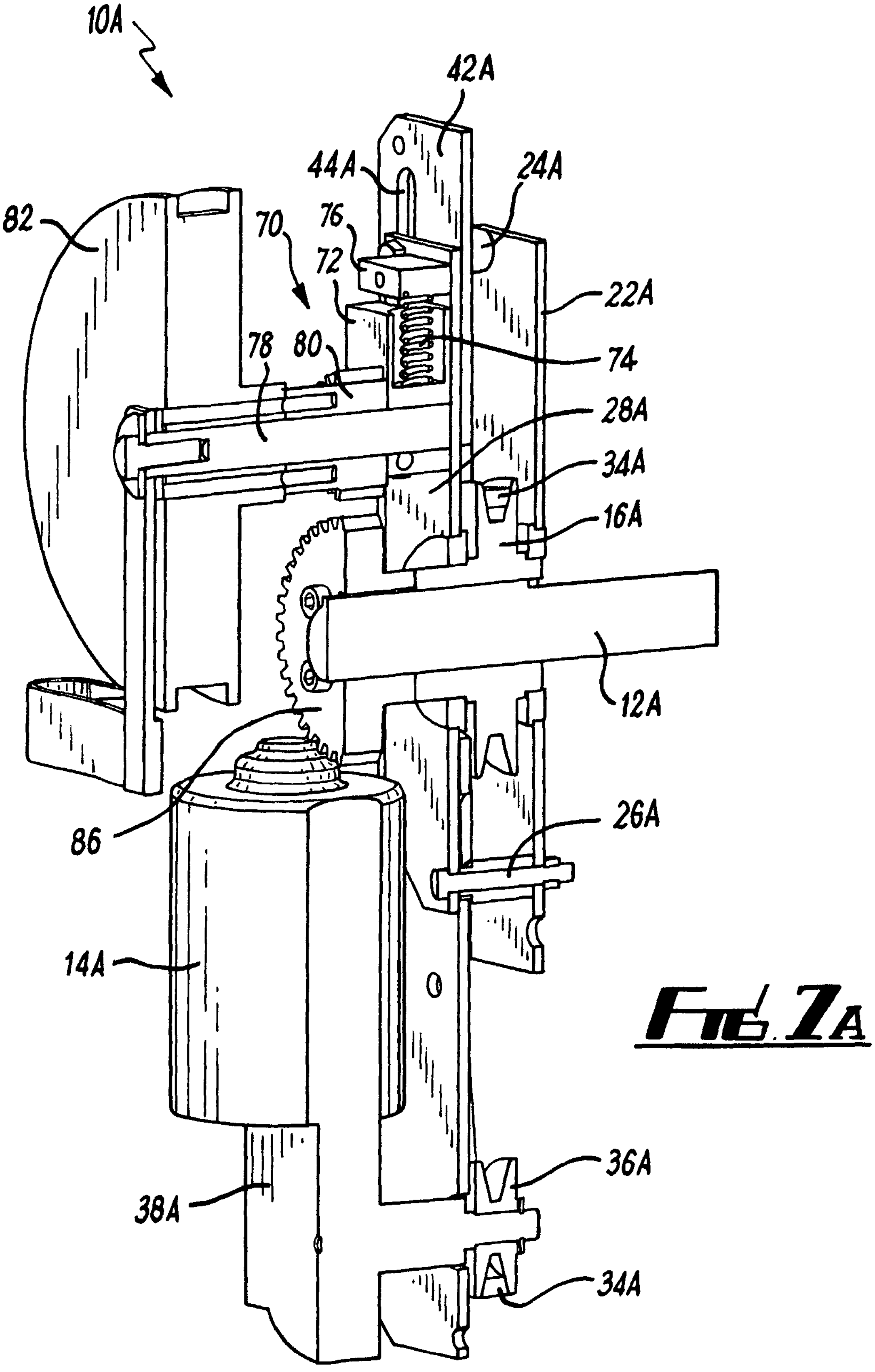
Figure 7B:
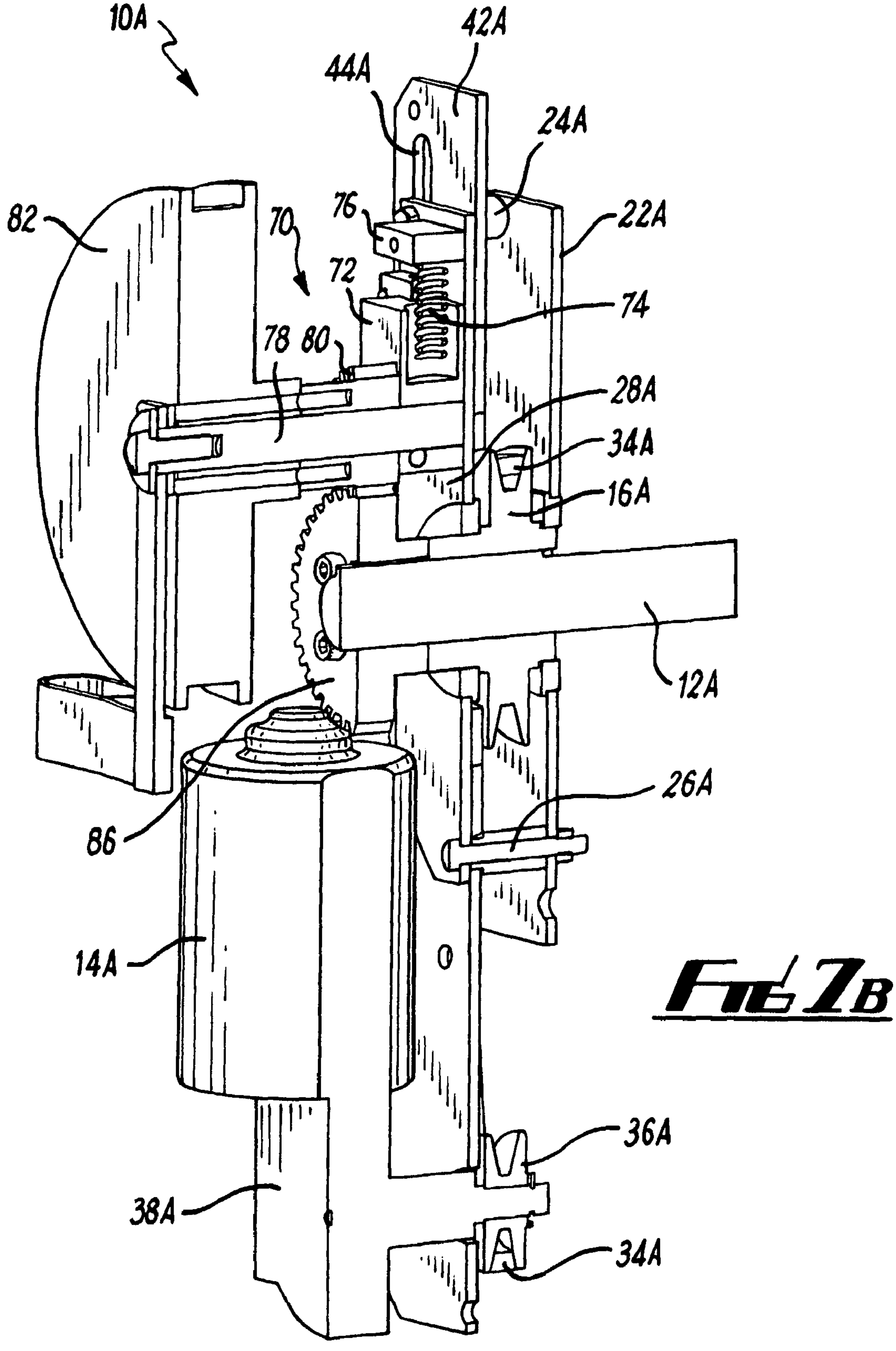
Figure 8:
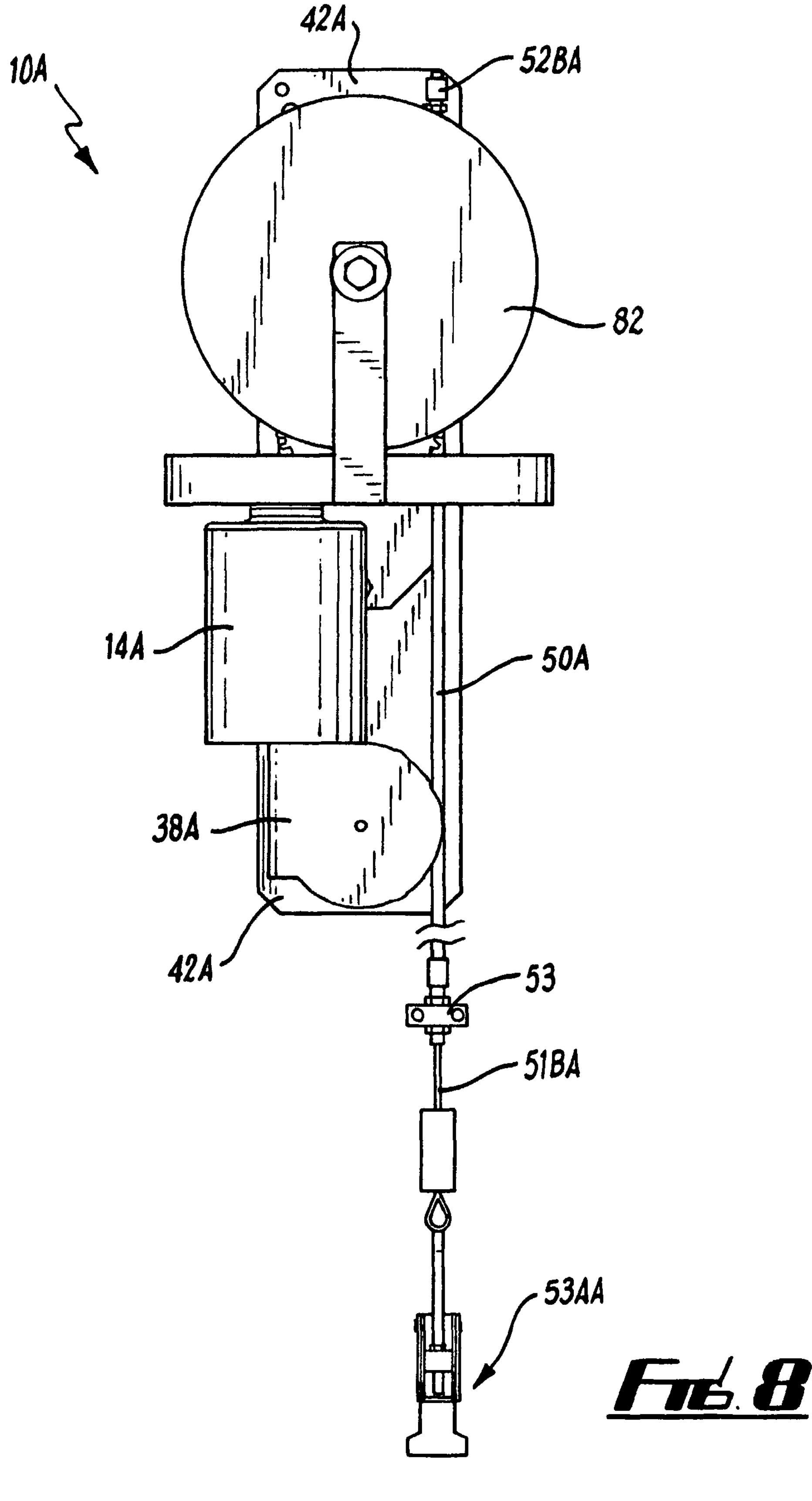
Figure 9:
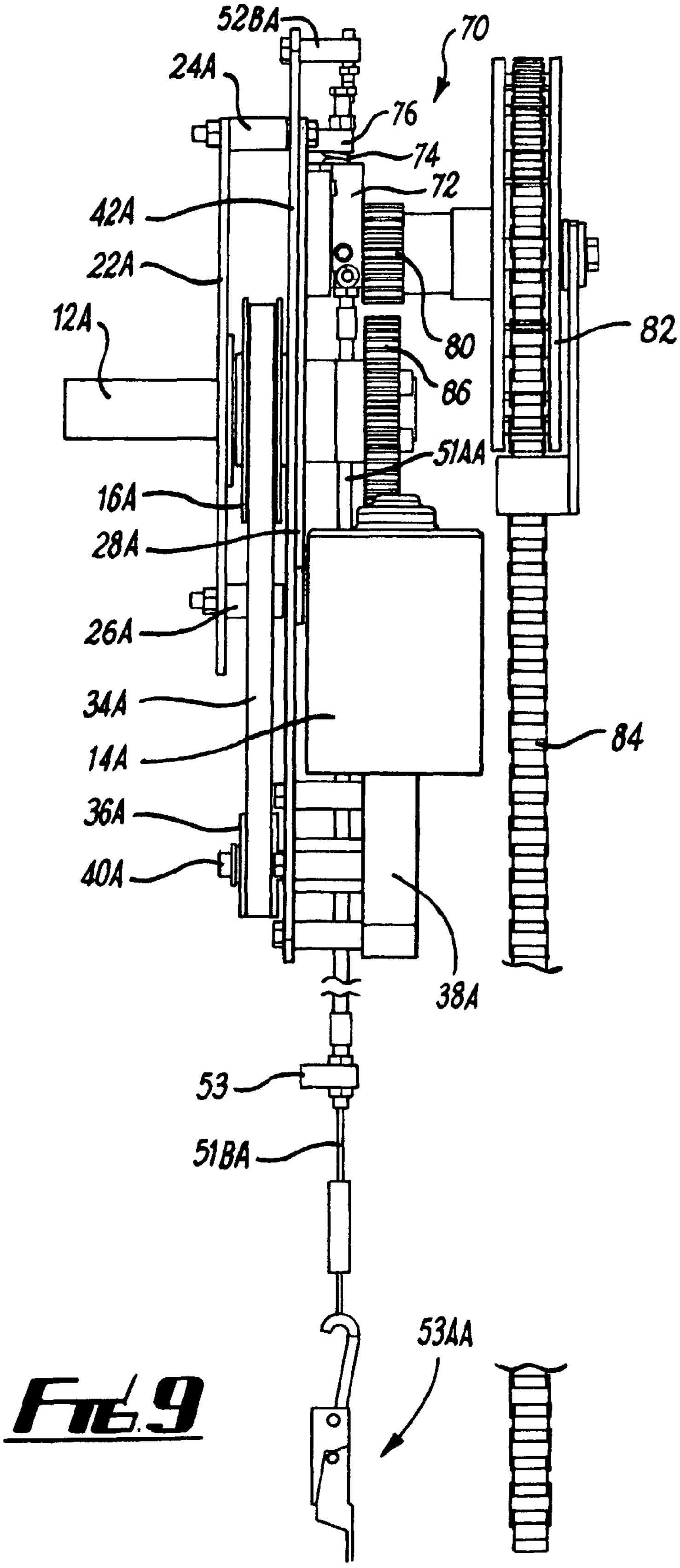

FIGS. 7A and 7B correspond generally with FIG. 6 on a further enlarged scale and partially cut away, showing manual drive arrangements disengaged and engaged, respectively;

FIG. 8 is a front elevation of the arrangement of FIGS. 6 and 7; and FIG. 9 is an end elevation of the arrangement of FIGS. 6 and 7.

Figure 1:
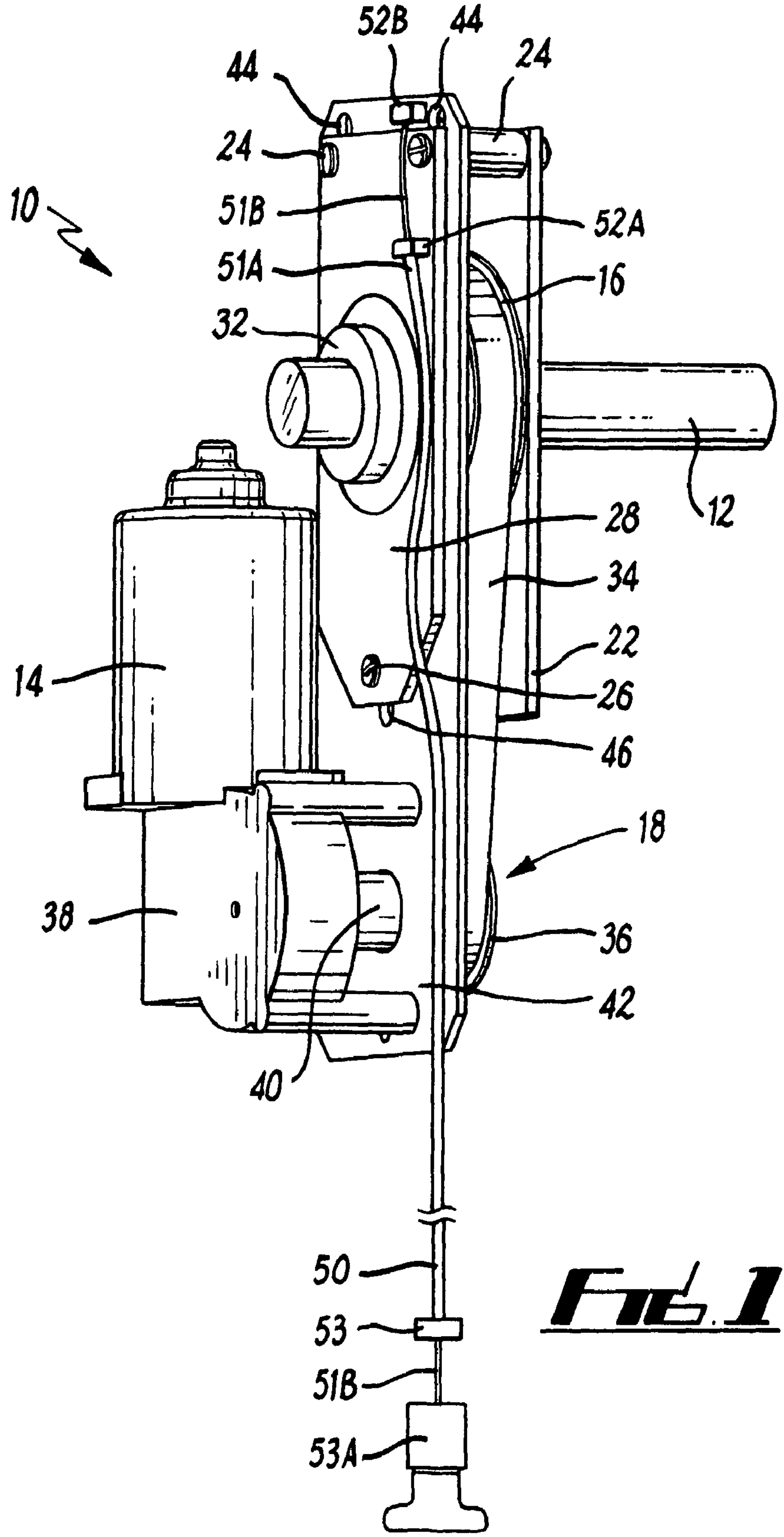
FIG. 1 is a front perspective view of a first embodiment of the present invention installed for driving a shaft.
Figure 2:
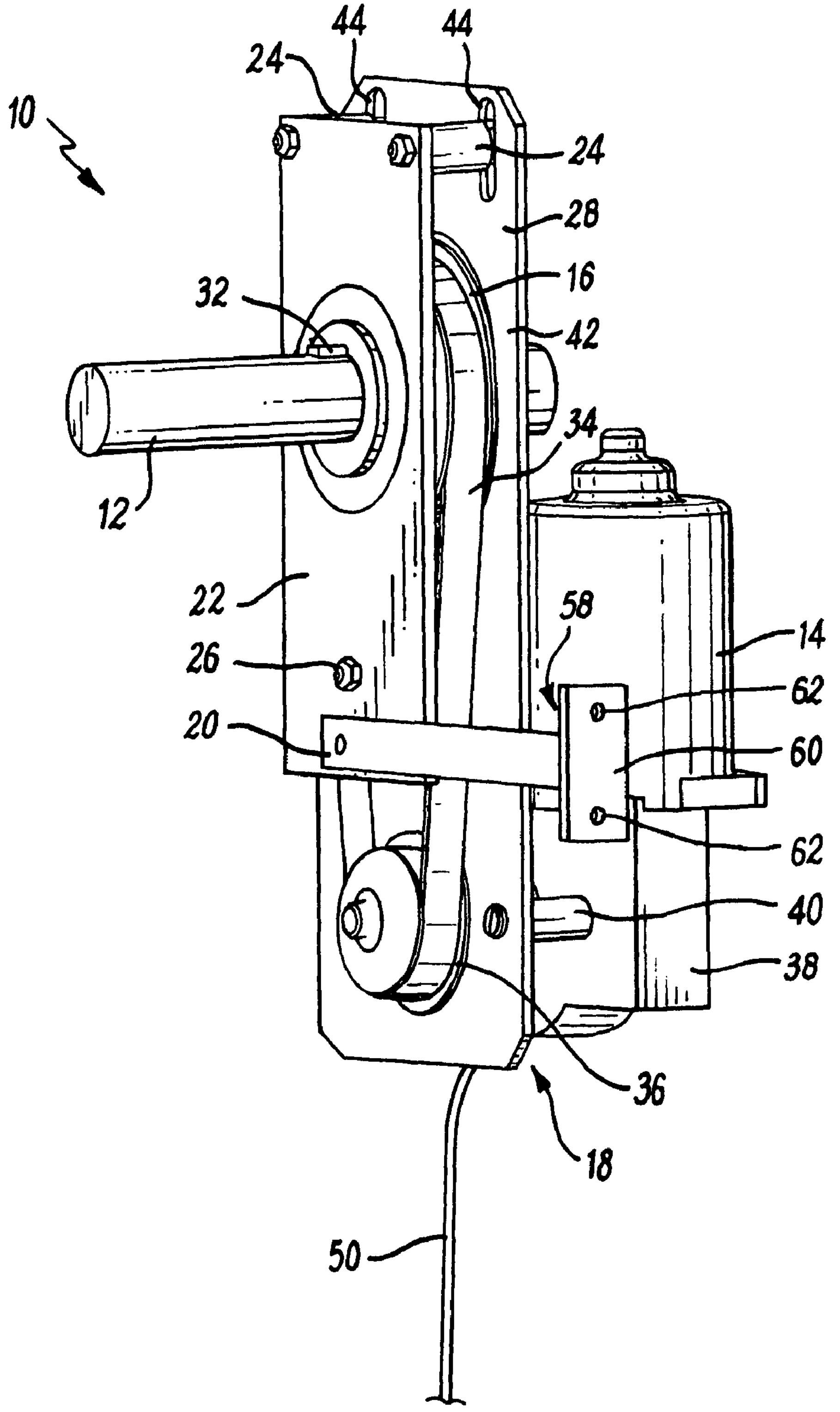
FIG. 2 is a rear perspective view of the arrangement of FIG. 1.
Figure 3:
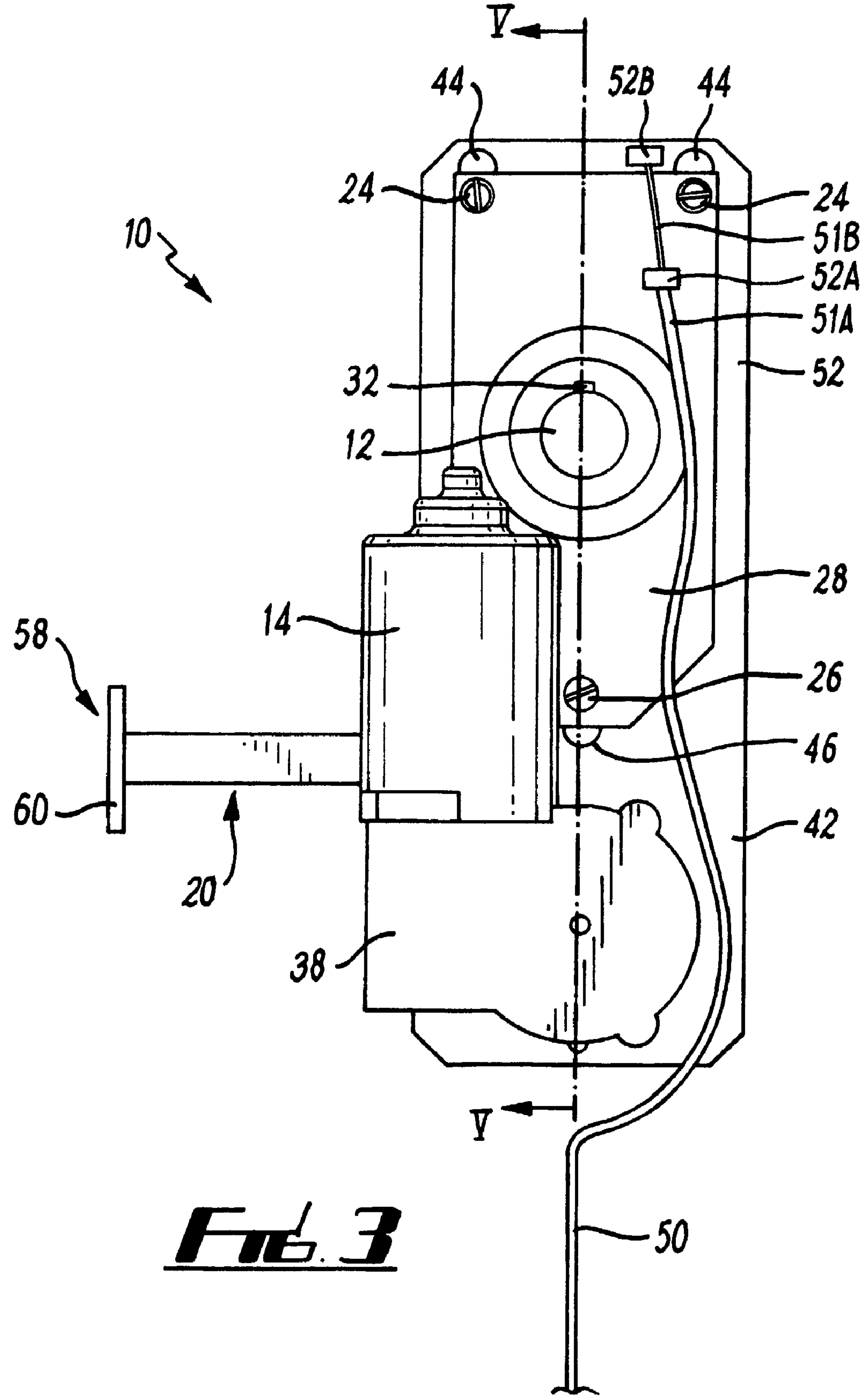
FIG. 3 is a front elevation of the arrangement of FIGS. 1 and 2.
Figure 4:
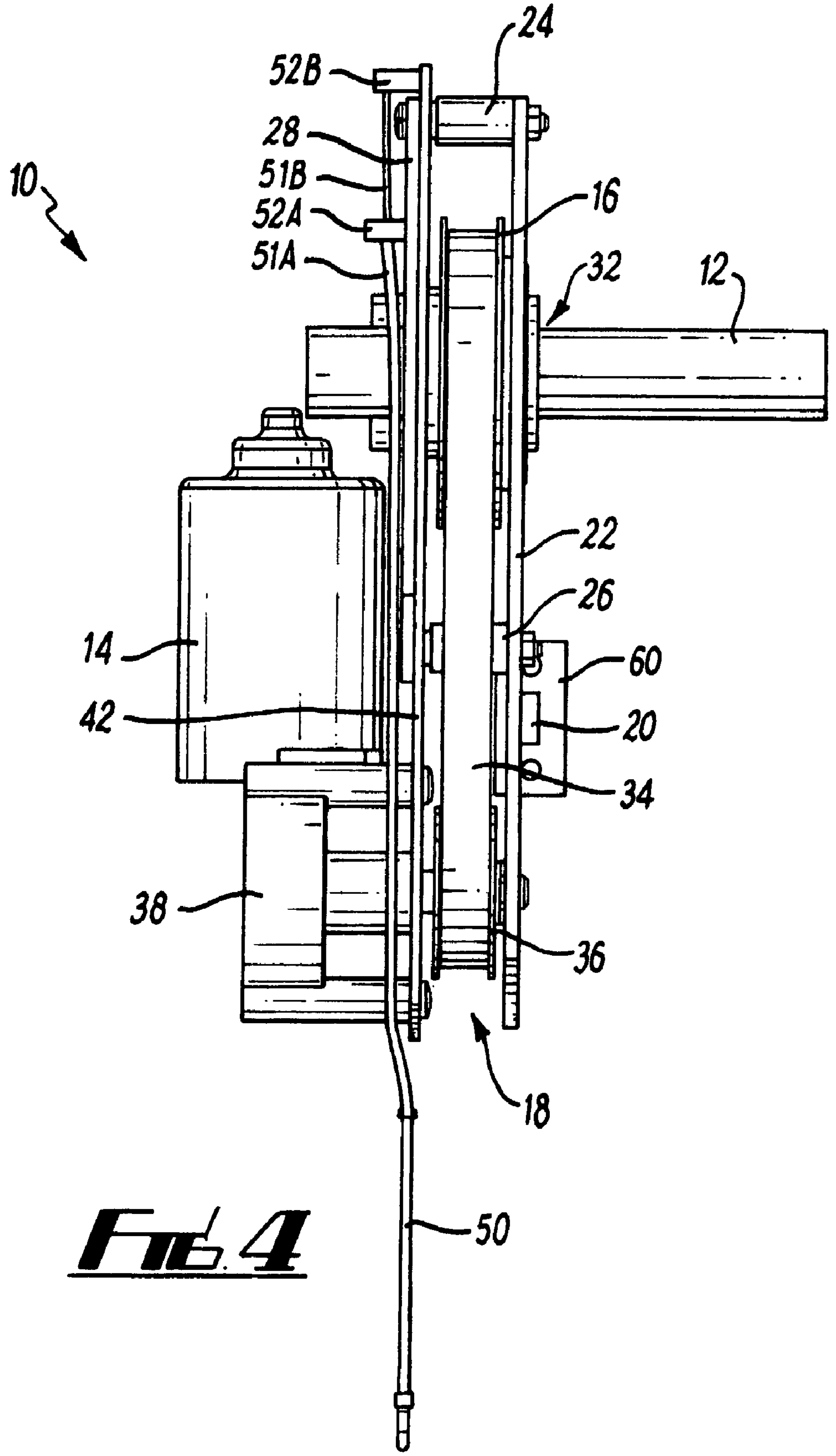
FIG. 4 is an end elevation of the arrangement.

FIG. 1 shows a drive arrangement 10 for a shaft 12, such as a shaft for driving a sectional door, roller shutter or the like. The arrangement 10 is in the form of a module, carried, in use, by the shaft 12 and including a motor 14, a driven wheel 16 fixed for rotation with the shaft 12 and drivable, in use, by the motor 14, and clutch means indicated generally at 18 and operable between the motor 14 and the wheel 16. The module further includes brace means 20 (FIG. 2) in the form of a limb attachable to a member or structure (not shown) which is fixed relative to the axis of the shaft 12, such as an adjacent wall, door frame, bearing plate for the shaft 12, or the like. This serves to brace the module against turning as the shaft 12 is driven.

Figure 5:
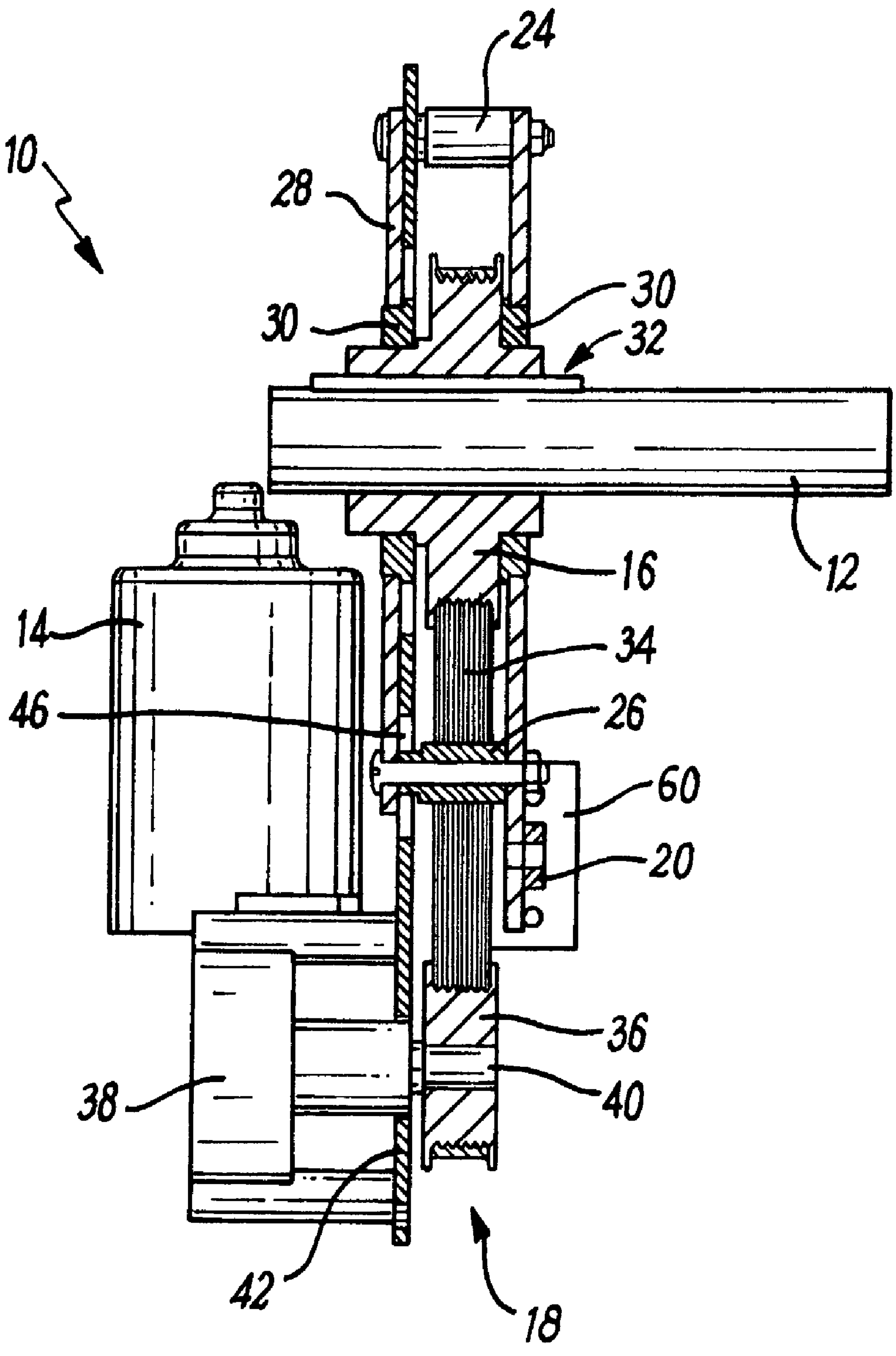
FIG. 5 is a section of the arrangement, along the line V-V of FIG. 3.

In more detail, the module 10 has a back plate 22 attached by means of two upper pillars 24 and a lower pillar 26 to a front plate 28. The driven wheel 16 is located between the plates 22, 28 and mounted to them by bearings 30 (FIG. 5). The wheel 16 is fitted around the shaft 12. The shaft 12 and wheel 16 are both formed to mesh at 32 so that the wheel 16 is fixed for rotation with the shaft 12. Drive to the wheel 16 is provided through a belt 34 from a drive wheel 36. The drive wheel 36 is driven by the motor 14 through a gearbox 38 which has an output shaft 40 on which the wheel 36 is mounted.

Consequently, operation of the motor 14 acts through the gearbox 38 to turn the shaft 40 and thus the wheel 36. If the belt 34 is engaged with the wheel 36 and also with the wheel 16, this drive is passed to the wheel 16 and thus to the shaft 12, thereby driving the door, shutter etc. However, the engagement of the belt 34 with the wheels 16, 36 is releasable, as can now be described.

In addition to the back and front plates 22, 28, which are fixed in position relative to the rotation axis of the shaft 12, the arrangement 10 further includes a slider plate 42 which carries the gearbox 38. The motor 14 may be mounted directly on the slider plate 42, or on the gearbox 38. However, the motor 14 and gearbox 38, and thus the output shaft 40 and drive wheel 36 are all carried by the slider plate 42.

The slider plate 42 has upper slots 44 to receive the upper pillars 24, and a lower slot 46 to receive the lower pillar 26. The fit of the pillars 24, 26 in the slots 44, 46 allows the plate 42 to slide to a limited extent, relative to the plates 22, 28. The slider plate 42 thus forms a first carriage structure by which the motor 14, gearbox 38 and wheel 36 move relative to the back plate 22 and front plate 28.

In consequence, the separation of the rotation axes of the wheels 16, 36 can be changed by sliding the plate 42 relative to the plates 22, 28. If the wheel 36 is moved away from the wheel 16, the belt 34 will tend to tighten until the belt 34 is driven by the wheel 36, and conveys the drive to the wheel 16. However, if the wheel 36 is moved towards the wheel 16, or is released to be free to move, engagement between the belt 34 and the wheels 16, 36 will be lost, and drive will not be conveyed as just described. The sliding motion of the plate 42 thus provides the arrangement 10 with a form of clutch 18 between the motor 14 and the wheel 16.

In normal use, it is envisaged that the clutch will remain engaged, with the belt 24 engaging the wheels 16, 36. To this end, a Bowden cable 50 is secured at one end to the arrangement 10 and provided, at its other end, with an arrangement for manipulating the cable 50. At the arrangement 10, the outer sheath 51A of the Bowden cable 50 is secured to a pillar 52A on the front plate 28. The inner cable 51B of the Bowden cable 50 is secured to a second pillar 52B, on the slider plate 42. The Bowden cable 50 extends away from the arrangement 10, to a remote location at which the sheath 51A is secured at a fixed position 53. An arrangement for manipulation of the Bowden cable 50 is also provided and, in this example, is an over-centre catch arrangement 53A by which the inner cable 51B can be pulled relative to the sheath 51A, or released. The remote end of the sheath 51A and the over-centre catch mechanism 53A may be mounted at a convenient position for manual use, such as on the door frame or an adjacent wall.

It can be understood from the previous description that the action of pulling on the inner cable 51B by means of the catch mechanism 53A tends to shorten the free length of the inner cable 51B between the pillars 52A, 52B, thus causing the pillars 52A, 52B to be pulled together and causing the plate 42 to slide relative to the plates 22, 28. In the orientation shown in the drawings, the plate 42 will be pulled down. This movement moves the wheel 36 away from the wheel 16, causing the belt 34 to tighten around the wheels 16, 36, so that the clutch 18 is engaged and the motor 14 is able to drive the shaft 12. It is envisaged that the inner cable 51B would be continuously held in tension in this manner, during normal use, by locking the catch mechanism 53A. Thus the belt 34 and wheels 16, 36 are normally engaged. Rotation of the shaft 12 (including the direction of rotation) can therefore be controlled by appropriate control of the motor 14. However, in the event that motor control is to be overridden (such as in the case of an emergency, fault in the motor or drive, or obstruction of the door being driven), tension on the inner cable 51B would be released, by releasing the catch mechanism 53A. This releases the force between the pillars 52A, 52B and thus allows the plate 42 to move up, releasing the engagement between the belt 34 and the wheels 16, 36, and disengaging the clutch 18. The shaft 12 is then free to turn.

It is envisaged that the belt 34 may be a strongly resilient material such as a synthetic plastic or rubber material, preferably having one or more V-shaped ribs along its length, and fitting into corresponding V-shaped circumferential groove or grooves in the wheels 16, 36, as can be seen in FIG. 5. Alternatively, a toothed belt could be used. A chain could be used with toothed wheels, but it is envisaged that more elaborate arrangements would then be required to ensure that the drive can be fully disengaged by the operation of the clutch. Further alternative arrangements could be envisaged.

A fixing screw or other arrangement is preferably provided to prevent movement of the arrangement 10 axially along the shaft 12.

It will be understood from the above description and the accompanying drawings that when the motor 14 is in use, the arrangement 10 will seek to apply torque to the shaft 12 in order to move the door, shutter arrangement etc. The reaction to this torque will tend to turn the arrangement 10 about the axis of the shaft 12. This torque is borne by the limb 20. The limb 20 is a rigid arm fixed at one end to the back plate 22, and extends away to a distal end 58 at which the limb 20 carries a plate 60 (see particularly FIG. 2). The plate 60 has bolt apertures 62 by which the plate 60 can be secured to a convenient member fixed relative to the axis of the shaft 12 such as an adjacent wall, door frame, shaft bearing plate or the like, as noted above. The arrangement is then braced against turning as the shaft 12 is driven. The limb 20 is preferably adjustable in length, to assist in readily fixing in this manner, and may be attached to the plate 22 in a manner which readily allows for changes in the angle at which the limb 20 extends away from the back plate 22.

The arrangement described above can readily be installed for driving an existing shaft 12, in the following manner. First, the module, which is self-contained, is offered to the end of the shaft 12 to fit the wheel 16 over the shaft end, and may be secured against further axial movement, as described above. The weight of the module is then supported by the shaft 12. The limb 20 is then secured to an appropriate member, such as a part of the door surround, or a convenient nearby wall. An appropriate arrangement is made at the remote end of the cable 50, to allow the clutch 18 to be controlled. The arrangement 10 is then in condition for use, as described above.

It will therefore be understood that installation is relatively simple in comparison with many prior proposals, and in particular, can be achieved by requiring only a single member (the plate 60) to be bolted to a fixed structure, and the arrangements for the remote end of the cable 50.

The remaining figures show an alternative embodiment which has many features in common with the embodiment described above. For those features which correspond, the same reference numeral is again used, with a suffix A. In view of the close similarity of many of the features, it is appropriate to direct further description primarily at those features which differ, the above description being applicable again in relation to those features which correspond.

The arrangement 10A is again for fitting to a shaft 12A and includes a driven wheel 16A on the shaft 12A, a drive wheel 36A on a slider plate 42A, and an arrangement, similar to that described above, for allowing the slider plate 42A to slide relative to a back plate 22A and a front plate 28A, both of which are fixed in position relative to the rotation axis of the shaft 12A. The alternative embodiment will also be provided with a limb similar to the limb 20 of the first embodiment, or another brace arrangement to brace the module 10A against turning as the shaft 12A is driven. The brace arrangements are not shown in FIGS. 6 to 9, in the interests of clarity.

Additional features are provided in the form of a second carriage structure indicated generally at 70. The second carriage assembly 70 includes a second carriage 72, slidably mounted on the front plate 28A to be movable relative to the front plate 28A in a direction toward and away from the shaft 12A, and generally parallel with the line connecting the centres of the wheels 16A, 36A. A compression spring 74 (see particularly FIGS. 7A and 7B) acts between the second carriage 72 and a block 76 fixed to the front plate 28A. The action of the spring 74 urges the second carriage 72 toward the shaft 12A.

The second carriage 72 also carries a fixed shaft 78 around which a toothed wheel 80 and a chain wheel 82 are free to rotate. The toothed wheel 80 and the chain wheel 82 are coupled to turn as one about the shaft 78. The chain wheel 82 carries an elongate, closed loop member, such as an endless chain 84. The chain 84 is illustrated in FIG. 9 but omitted from FIGS. 6, 7 and 8 for reasons of clarity. The chain 84 preferably extends away from the assembly 10A to a position at which it can readily be manually used to turn the chain wheel 82 about the shaft 78, thereby turning the toothed wheel 80.

In addition to the wheel 16A, the shaft 12A is fitted with a toothed wheel 86. The second carriage 72 can move to a position in which the wheels 80, 86 mesh, so that the shaft 12A can be turned by means of the chain 84, coupled through the shaft 78 and the wheels 80, 86. This allows for manual operation of the shaft 12A when the clutch 18A is disengaged or, for example, in the event that a power cut or other failure prevents use of the motor 14A. However, in normal use, the wheels 80, 86 will not be meshed, and the clutch 18A will be engaged. This is achieved by control of the slider plate 42A and the second carriage 72, as can now be described.

This control is again achieved by means of a Bowden cable 50A. This has a sheath 51AA secured to a pillar 52AA mounted on the second carriage 72, and an inner cable 51BA secured to a pillar 52BA carried by the slider plate 42A. The Bowden cable 50A extends away from the arrangement 10, as described in relation to the first embodiment, to a remote location at which the sheath 51AA is fixed, and an over-centre catch mechanism 53AA is provided to allow the inner cable 51BA to be pulled down or released.

When the inner cable 51BA is pulled down, the free length of the inner cable 51BA between the pillars 52AA and 52BA shortens, which creates a force to pull the pillars 52AA, 52BA toward each other. This movement is countered by the action of the compression spring 74, and by tension increasing in the belt 34A as the clutch 18A engages, so that both the plate 42A and the second carriage 78 will tend to move. Appropriate choice of strength for the spring 78 allows the catch mechanism 53M to cause the pillars 52AA, 52BA to be pulled together sufficiently forcefully to move the second carriage 72 away from the shaft 12A, thereby disengaging the wheels 80, 86, and to slide the plate 28A to move the wheel 36A away from the wheel 16A, thereby engaging the clutch 18A. The arrangement is then in the condition shown in FIG. 7A. The catch mechanism 53A is then normally locked in this condition, with the chain 84 and chain wheel 82 disengaged from the shaft 12A, and with the motor 14A able to drive the shaft 12A, through the clutch 18A, which is engaged. The two functions of engaging the clutch 18A and unmeshing the wheels 80, 86 are thus both the result of the single operation of pulling the inner cable 51BA. The two functions are thus coordinated so that the clutch 18A is engaged as soon as the wheels 80, 86 are unmeshed.

In the event that manual operation of the shaft 12A is required, the catch mechanism 53AA is released, to release the tension on the inner cable 51BA. This allows the pillars 52AA, 52BA to move apart under the influence of the spring 74 and any tension in the belt 34A. The second carriage 72 moves toward the shaft 12A by the action of the spring 74, and the wheels 16A, 36A are free to move together, releasing tension in the belt 34A. Accordingly, the clutch 18A disengages and the wheels 80, 86 mesh together, thus disconnecting the motor 14A from the shaft 12A, and engaging the chain 84 and chain wheel 82 with the shaft 12A, allowing the shaft 12A to be turned manually. The arrangement is then in the condition shown in FIG. 7B. The two functions of disengaging the clutch 18A and meshing the wheels 80, 86 are thus both the result of the single operation of releasing the tension on the inner cable 51BA. The two functions are thus coordinated so that manual operation is available as soon as the clutch is disengaged.

In alternative arrangements, separate control mechanisms could be provided for the two functions of controlling the clutch and controlling the wheels 80, 86.

It can be understood from the above description that in both examples, the clutch 18, 18A is controlled by the application of force between the pillars. In both examples, the force is ultimately borne by the slider plate and the front plate, being applied directly to the front plate in the first embodiment, and indirectly through the spring 74 in the second embodiment. Thus, control of the arrangement is achieved by forces borne within the arrangement itself. In particular, although a downward force is applied to the inner cable of the Bowden cable, at its remote end, this does not result in additional lateral force being applied to the shaft 12. This contrasts with the arrangement in the applicant's previous proposal, mentioned above, in which the force used to control the arrangement results in a reaction force applied laterally to the shaft 12. It will thus further be readily understood from this description that other arrangements could be used for creating force between the pillars, such as an actuator controlled from a remote location. However, the use of a purely mechanical arrangement is considered particularly advantageous in providing a reliable manual alternative to the operation of the motor, in case of a power failure or other malfunction.

It will be apparent from the above description that many variations and modifications can be made to the apparatus described above, without departing from the scope of the present invention. In particular, many different materials and many different shapes, sizes and relative shapes and sizes can be used for the various components.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A drive arrangement for a shaft, the arrangement having a module which is carried, in use, by the shaft and includes a motor, a driven wheel fixed, in use, for rotation with the shaft and drivable, in use, by the motor, and clutch means operable between the motor and the wheel, the clutch means including a base structure carried, in use, by the shaft, a first carriage structure movable relative to the base structure and carrying the motor, a drive wheel driven by the motor, and a belt around the drive wheel and the driven wheel, whereby the belt can be releasably engaged with the wheels by means of movement of the first carriage structure relative to the base structure, and wherein the arrangement includes a second carriage structure movable relative to the base structure into and out of driving engagement with the shaft to provide drive of the shaft, independently of the motor, wherein the second carriage structure and the shaft carry respective toothed members which mesh when the second carriage structure and the shaft are in driving engagement, wherein the second carriage structure includes a manually operable drive means for manually driving the shaft when the second carriage structure and the shaft are in driving engagement, wherein control means are provided, wherein the control means is a Bowden cable extending from the assembly to a remote location and having an inner cable and sheath attached to respective ones of the first and second carriage structures, and the Bowden cable is operable, in use, from the remote location to releasably apply a force between the first carriage structure and the base structure, to urge apart the drive wheel and the driven wheel, thereby engaging the clutch means and the Bowden cable is operable, in use, from the remote location, to cause the second carriage structure to move into and out of driving engagement as soon as the clutch means is disengaged and engaged, respectively.

2. A drive arrangement according to claim 1, wherein the manually operable drive means comprise a wheel operable to turn by means of an elongate closed loop member, the wheel being coupled with the toothed member of the second carriage structure, to cause the shaft to be driven when the wheel is turned and the toothed members are meshed.

3. A drive arrangement according to claim 1, wherein spring means are provided to urge the second carriage member into driving engagement with the shaft, when the Bowden cable is released.

4. A drive arrangement according to claim 3, wherein the sheath is attached to the second carriage member.

5. A drive arrangement according to claim 3, wherein the inner cable is attached to the first carriage member.

6. A drive arrangement according to claim 1, wherein the sheath is fixedly mounted at the remote location, whereby the clutch means may be operated by manipulation of the inner cable relative to the sheath.

* * * * *